US008904993B2

(12) United States Patent
Santoso et al.

(10) Patent No.: US 8,904,993 B2
(45) Date of Patent: Dec. 9, 2014

(54) SYSTEMS AND METHODS FOR STABILIZING TORQUE DURING MODE TRANSITION IN DIRECT INJECTION ENGINES

(75) Inventors: Halim G. Santoso, Novi, MI (US); Bruce F. Hunter, Okemos, MI (US); Donovan L. Dibble, Utica, MI (US)

(73) Assignee: GM Global Technology Operations LLC

( * ) Notice: Subject to any disclaimer, the term of this patent is extended or adjusted under 35 U.S.C. 154(b) by 1578 days.

(21) Appl. No.: 12/484,449

(22) Filed: Jun. 15, 2009

(65) Prior Publication Data

US 2010/0313845 A1    Dec. 16, 2010

(51) Int. Cl.
| | | |
|---|---|---|
| F02B 17/00 | (2006.01) | |
| F01L 1/34 | (2006.01) | |
| F02D 13/02 | (2006.01) | |
| F02D 41/00 | (2006.01) | |
| F02D 37/02 | (2006.01) | |
| F02D 41/30 | (2006.01) | |
| F02B 75/12 | (2006.01) | |

(52) U.S. Cl.
CPC ...... *F01D 41/0002* (2013.01); *F02D 2041/001* (2013.01); *Y02T 10/123* (2013.01); *F02D 37/02* (2013.01); *F02D 2041/002* (2013.01); *F02D 41/3029* (2013.01); *F02D 13/0238* (2013.01); *F02B 2075/125* (2013.01); *Y02T 10/42* (2013.01); *Y02T 10/18* (2013.01); *F02D 41/307* (2013.01); *F02B 17/005* (2013.01)
USPC .............................. 123/295; 123/90.15

(58) Field of Classification Search
USPC .............. 123/90.15, 219, 291, 295, 345, 346, 123/347, 348, 430, 399, 406.24, 406.52, 123/436, 679, 683, 704; 60/285; 701/103, 701/104, 110
See application file for complete search history.

(56) References Cited

U.S. PATENT DOCUMENTS

| | | | | |
|---|---|---|---|---|
| 6,257,209 | B1 * | 7/2001 | Hyodo et al. | 123/520 |
| 6,378,484 | B1 * | 4/2002 | Russell et al. | 123/295 |
| 6,467,442 | B2 * | 10/2002 | Russell et al. | 123/90.15 |
| 6,655,345 | B2 * | 12/2003 | Ogawa et al. | 123/295 |
| 8,068,944 | B2 * | 11/2011 | Tanaka | 701/4 |
| 2007/0193539 | A1 * | 8/2007 | Harada et al. | 123/90.16 |
| 2008/0066713 | A1 * | 3/2008 | Megli et al. | 123/295 |

\* cited by examiner

*Primary Examiner* — Mahmoud Gimie
*Assistant Examiner* — Sizo Vilakazi

(57) ABSTRACT

An engine mode control system for an internal combustion engine includes a transition control module and an intake cam phaser control module. The transition control module controls a transition from a first engine mode to a second engine mode and determines a desired air mass. The engine is operated at a first air/fuel ratio (AFR) in the first engine mode and at a second AFR in the second engine mode. The desired air mass is based on the second AFR. The intake cam phaser control module adjusts the intake cam phaser based on the desired air mass during the transition.

20 Claims, 4 Drawing Sheets

SYSTEMS AND METHODS FOR STABILIZING TORQUE DURING MODE TRANSITION IN DIRECT INJECTION ENGINES

FIELD

The present disclosure relates to direct injection engines, and more particularly to engine mode control systems and methods for transitioning the direct injection engines between a homogenous mode and a stratified mode with improved torque stability.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A spark ignition direction injection (SIDI) engine may be operated in two engine modes: a homogeneous (i.e., stoichiometric) mode and a stratified (i.e., lean) mode. The homogeneous mode is similar to a conventional spark ignition mode. An air/fuel mixture is introduced into a combustion chamber during an intake stroke of an engine cycle. The air/fuel ratio is approximately 14.7 for gasoline engines. The cylinder charge is nearly homogeneous in composition, temperature, and residual level when an intake valve is closed.

In the stratified mode, the engine is operated at a diluted air/fuel mixture that is lean of stoichiometry (for example, the air/fuel ratio may be approximately 20-30). The fuel is injected to a region near a spark plug at a later stage of the compression stroke. The engine is operated in a more fuel efficient manner during the stratified mode. When medium or high load and high speed are desired, the engine is operated in the homogeneous mode. When low load and speed are desired, the engine is operated in the stratified mode. Engine torque fluctuations may occur when the engine is transitioned between the homogeneous mode and the stratified mode.

SUMMARY

An engine mode control system for an internal combustion engine includes a transition control module and an intake cam phaser control module. The transition control module controls a transition from a first engine mode to a second engine mode and determines a desired air mass. The engine is operated at a first air/fuel ratio (AFR) in the first engine mode and at a second AFR in the second engine mode. The desired air mass is based on the second AFR. The intake cam phaser control module adjusts the intake cam phaser based on the desired air mass during the transition.

A method includes: controlling a transition from a first engine mode to a second engine mode, wherein an engine is operated at a first air/fuel ratio (AFR) in the first engine mode and at a second AFR in the second engine mode; determining a desired air mass based on the second AFR; and adjusting an intake cam phaser based on the desired air mass.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein.

DETAILED DESCRIPTION

Figure 1:
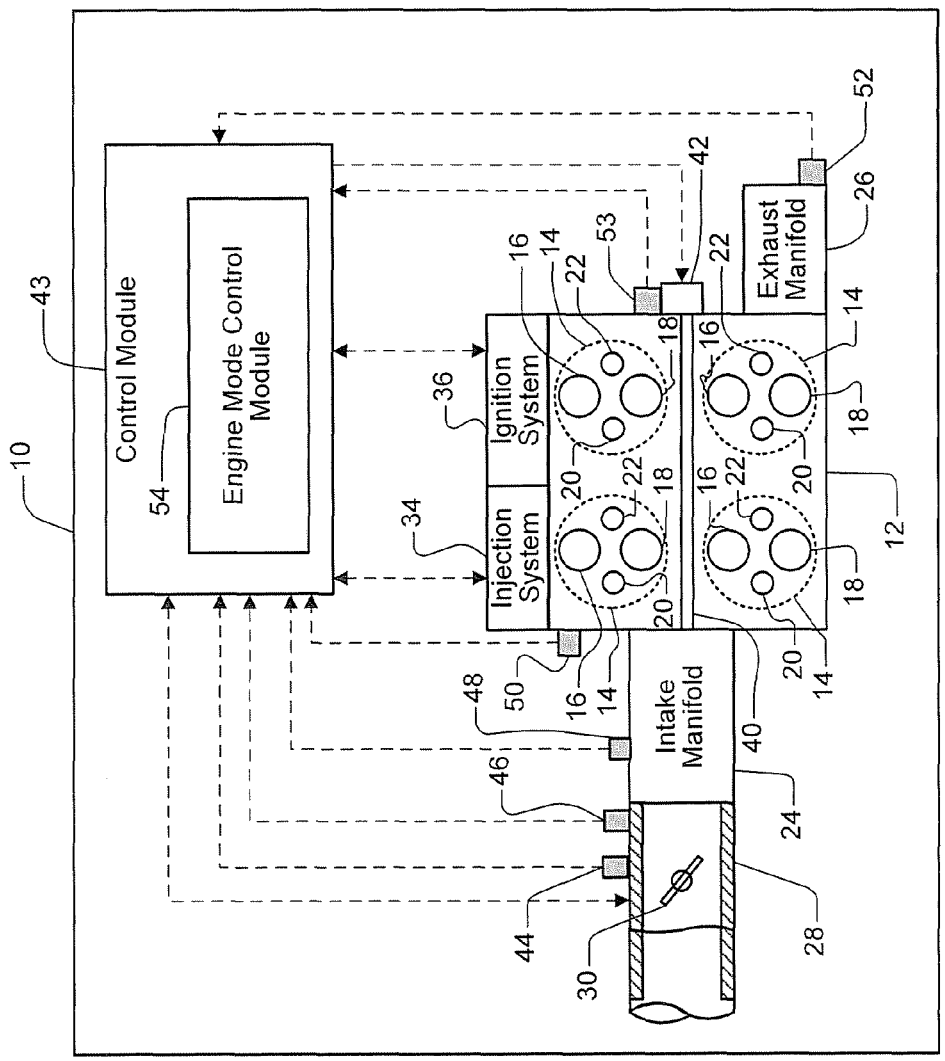
FIG. 1 is a functional block diagram of an engine system that includes an engine mode control module in accordance with the teachings of the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine mode control module according to the present disclosure allows for a smooth transition between a stratified (lean) mode and a homogenous (stoichiometric) mode. The engine mode control module adjusts an intake cam phaser position and spark timing to achieve a desired air/fuel ratio (AFR) for a desired engine mode during an early stage of transition. The throttle position remains the same during the early state of transition. The throttle position is adjusted during a later stage of transition after the desired AFR is achieved. The engine mode control module allows for a smooth and quick transition with minimized torque fluctuations.

Referring to FIG. 1, an engine system 10 includes a spark ignition direct injection (SIDI) engine 12 that includes a plurality of cylinders 14. While four cylinders 14 are shown, the plurality of cylinders 14 may include any number of cylinders 14, such as, for example, 2, 5, 6, 8, 10 and 12. The plurality of cylinders 14 each include an intake valve 16, an exhaust valve 18, a fuel injector 20, and a spark plug 22. The cylinders 14 define combustion chambers that communicate with an intake manifold 24 and an exhaust manifold 26 via respective intake valves 16 and exhaust valves 18.

The intake manifold 24 communicates with a throttle body 28 that includes a throttle plate 30 therein. Air is drawn into the intake manifold 24 and the combustion chambers through the throttle body 28. Air is mixed with fuel and combusted within the cylinders 14 to produce engine torque. The throttle plate 30 is selectively moved to regulate the air flow through the throttle body 28.

Fuel injectors 20 are directly coupled to the combustion chambers and may deliver liquid fuel directly into the combustion chambers. Fuel is delivered to the fuel injectors 20 by an injection system 34 that may include a fuel tank, a fuel pump, and a fuel rail (all not shown). An ignition system 36 energizes the spark plugs 22 that ignite the air/fuel mixture in the combustion chambers.

An intake camshaft 40 communicates with the intake valves 16 and a crankshaft (not shown) and regulates timing of the intake valves 16 relative to rotation of the crankshaft. An intake cam phaser 42 is mounted on an end of the intake camshaft 40 and may selectively alter the opening timing of the intake valves 16 by retarding or advancing an angular position of the intake cam phaser 42 relative to the intake camshaft 40.

A plurality of sensors communicate with a control module 43 and monitors various engine operating conditions. The plurality of sensors include, but are not limited to, a throttle position sensor 44, a mass air flow (MAF) sensor 46, a manifold air pressure (MAP) sensor 48, an engine speed sensor 50, a wide range oxygen sensor 52, and an intake cam phaser position sensor 53. The throttle position sensor 44 is provided at the throttle body 28 to monitor the throttle position of the throttle plate 30. The MAF sensor 46 is provided at the throttle body 28 to measure the MAF. The MAP sensor 48 is provided at the intake manifold 24 to measure the MAP. The engine speed sensor 50 measures engine speed (RPM). The wide range oxygen sensor 52 is provided at an exit of the exhaust manifold 26 to measure a concentration of oxygen in the exhaust gas. An air/fuel ratio (AFR) of an air/fuel mixture in the combustion chambers may be determined based on the concentration of oxygen in the exhaust gas. The intake cam phaser position sensor 53 measures the angular position of the intake cam phaser 42.

The control module 43 includes an engine mode control module 54 that transitions the engine 12 between a homogenous mode and a stratified mode based on requested engine torque. The engine mode control module 54 regulates intake cam phaser position, spark timing, fuel injection, and throttle position during engine mode transition to achieve a smooth and quick transition with minimized torque fluctuations.

Figure 2:
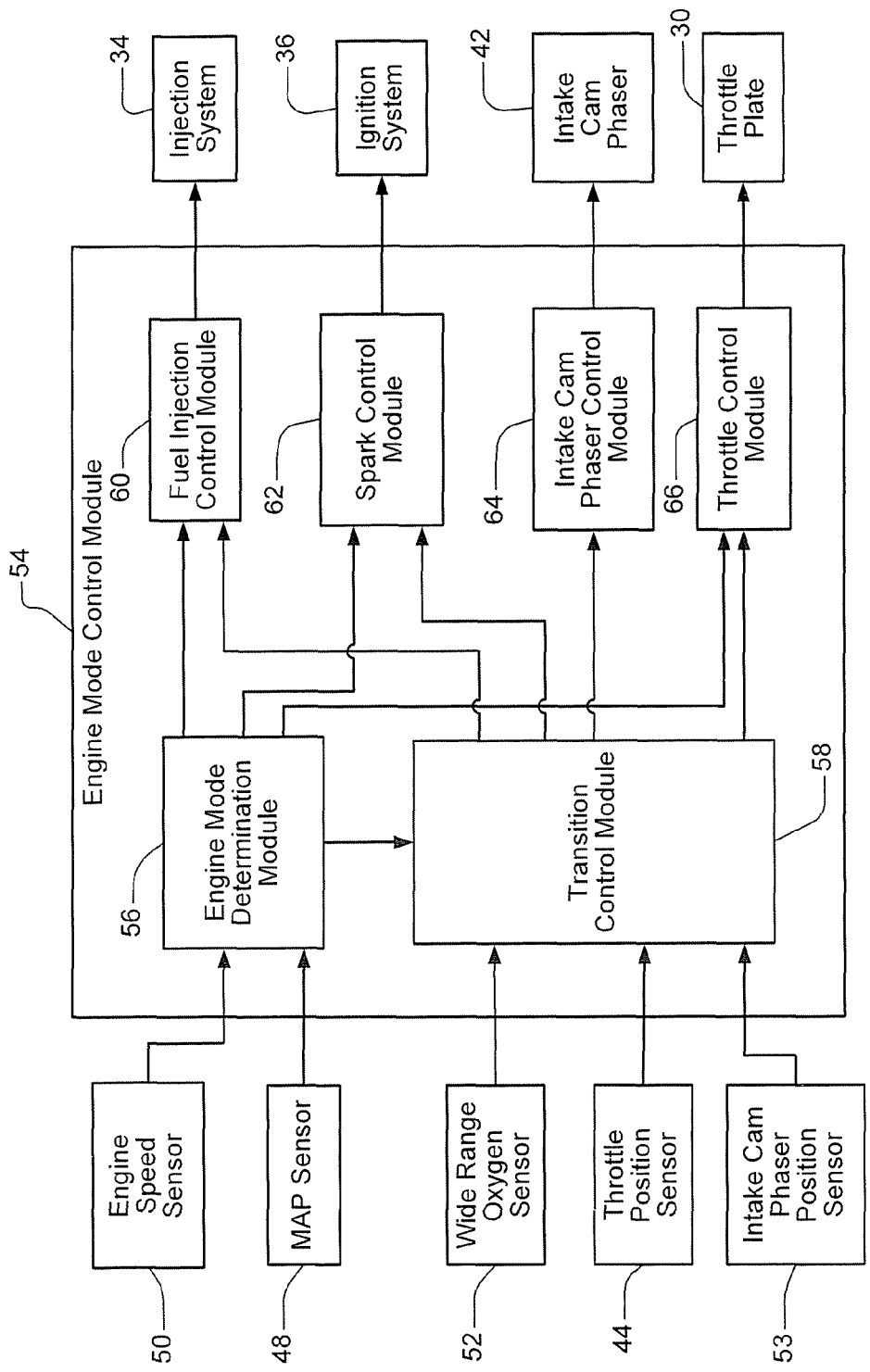
FIG. 2 is a functional block diagram of an engine mode control module in accordance with the teachings of the present disclosure.

Referring to FIG. 2, the engine mode control module 54 includes an engine mode determination module 56, a transition control module 58, a fuel injection control module 60, a spark control module 62, an intake cam phaser control module 64, and a throttle control module 66.

The engine mode determination module 56 communicates with the engine speed sensor 50 and the MAP sensor 48. A requested engine torque may be determined based on engine speed and engine load. Signals from the MAP sensor 48 provide an indication of engine load. The engine mode determination module 56 determines a desired engine mode based on the requested engine torque. When a medium or high engine speed and load are desired, the engine mode determination module 56 determines a homogeneous mode. When a low engine speed and load are desired, the engine mode determination module 56 determines a stratified mode. For example, the engine mode determination module 56 may determine a homogeneous mode when the engine speed exceeds a threshold speed (for example only, 2000 RPM) and/or when the MAP exceeds a threshold pressure (for example only, 75-80 KPa).

When the engine 12 is operated in the homogenous mode, fuel is injected into the cylinders 14 in an intake stroke of an engine cycle. Air is drawn into the cylinders 14 in the intake stroke. Therefore, a homogenous air/fuel mixture is created in the cylinders 14. The air/fuel ratio (AFR) of the air/fuel mixture in the homogenous mode is close to a stoichiometric ratio, i.e., approximately 14.7 for a gasoline engine. The spark is ignited early in the combustion stroke. For example, the spark timing occurs approximately 40 degrees to TDC before TDC.

When the engine 12 is operated in the stratified mode, air is drawn into the cylinders 14 during the intake stroke. The fuel is injected at a later stage of the compression stroke. For example, the fuel is injected during the engine compression stroke (for example, 180 degrees to the top dead center (TDC) before TDC compression). Therefore, fuel is sprayed directly into an area adjacent to the spark plug 22 and a stratified air/fuel layer is formed adjacent to the spark plug 22. The stratified air/fuel layer contains a stoichiometric mixture or a mixture that is slightly rich of stoichiometry. However, the overall AFR in the entire combustion is, for example, at least 20 to 45, depending on engine load. The greater the engine load, the lower the AFR. The spark timing may occur approximately 50 degrees before TDC to 30 degrees after TDC. The fuel economy is improved during the stratified mode.

The transition control module 58 compares the desired engine mode with a current engine mode and determines whether a transition is desired. When the desired engine mode is different from the current engine mode, a transition may be initiated. The transition control module 58 determines the transition type (i.e., from a homogenous mode to a stratified mode or from a stratified mode to the homogenous mode). The transition control module 58 also determines a desired AFR based on the requested engine torque, a desired air mass based on the desired AFR, and a desired throttle position based on the desired air mass. The desired air mass is a function of a desired torque, predicted residual gas mass, predicted intake and exhaust position, and current throttle position.

The transition control module 58 selects a transition schedule based on the transition type. Generally, the transition schedule may include a first stage (i.e., an early stage) and a second stage (i.e., a later stage) that occurs after the first stage. In the early stage, the intake cam phaser 42, the spark timing, and the AFR may be adjusted to smoothly and quickly transition the engine 12 to run at the desired AFR that corresponds to the desired engine mode. In the later stage that occurs after the engine 12 is operated at the desired AFR, the throttle opening is adjusted and the intake cam phaser 42 is returned to an original position according to a normal setting.

The transition control module 58 controls the fuel injection control module 60, the spark control module 62, the intake cam phaser control module 64, and throttle control module 66 according to the selected transition schedule. The fuel injection control module 60, the spark control module 62, the intake cam phaser control module 64, and the throttle control module 66 regulate the injection timing, the spark timing, the intake cam phaser position, and the throttle plate, respectively, according to the transition schedule. The transition control module 58 communicates with the wide range oxygen sensor 52, the throttle position sensor 44, and the intake cam phaser position sensor 53. The transition control module 58 monitors the AFR, the throttle position and the intake cam phaser position to ensure that the AFR, the throttle position, and the intake cam phaser position are changed according to the transition schedule.

The intake cam phaser control module 64 determines a desired angular position based on the desired air mass. The degree of advancing or retarding the intake cam phaser 42 is a function of the desired air mass. The intake cam phaser control module 64 advances or retards the intake cam phaser 42 to produce the desired air mass.

When the engine 12 is transitioned from the homogenous mode to the stratified mode, the desired air mass is increased.

Therefore, the intake cam phaser control module 64 advances the angular position of the intake cam phaser 42 to increase the air mass drawn into the cylinders 14. When the engine 12 is transitioned from the stratified mode to the homogenous mode, the desired air mass is decreased. The intake cam phaser control module 64 retards the intake cam phaser 42 to reduce the air mass drawn into the cylinders 14.

The spark control module 62 controls spark timing to gradually increase or decrease the AFR according to the transition schedule. The AFR is changed during transition due to increased or decreased air mass and/or increased fuel injection. The spark control module 62 controls the spark timing in response to these changes to adjust the AFR according to the transition schedule.

For example only, when the engine 12 is transitioned from the homogenous mode to the stratified mode, the AFR is maintained at the stoichiometric ratio (i.e., 14.7) in a part of the early stage of transition. Because the intake cam phaser 42 is advanced to increase the air mass, the spark control module 64 retards the spark timing to ensure a complete combustion to reduce torque perturbation while maintaining the AFR to the stoichiometric ratio.

In contrast, when the engine 12 is transitioned from the stratified mode to the homogenous mode, the AFR is gradually decreased in the early stage of transition. The spark timing is retarded based on the AFR to ensure that the AFR is gradually decreased according to the transition schedule.

The fuel injection control module 60 controls fuel injection during the transition. The fuel injection control module 60 switches the timing of fuel injection between an early injection and a late injection during transition. In the homogeneous mode, the fuel injection occurs in the intake stroke of an engine cycle. In the stratified mode, the fuel injection occurs later in the compression stroke. The fuel injection control module 60 controls the fuel injectors 20 to enrich or lean out the air/fuel mixture based on the transition types. To transition the engine 12 from the stratified mode to the homogenous mode, the air/fuel mixture may be enriched. The fuel injection control module 60 initiates a dual fuel injection in the early stage of the transition to enrich the air/fuel mixture.

The fuel injection control module 60 may start a first injection pulse in the intake stroke and maintain a second injection pulse (i.e., the late injection pulse) in the compression stroke. The dual injection event enriches the air/fuel mixture while shifting the injection event to the intake stroke. After the air/fuel mixture is enriched and the AFR is decreased to an intermediate value, for example, approximately 20, the fuel injection control module 60 maintains the first injection pulse in the intake stroke and stops the second injection pulse in the compression stroke. Therefore, the fuel injection is switched to a single injection in the intake stroke according to the injection timing of the homogenous mode.

Similarly, to transition the engine 12 from the homogenous mode to the stratified mode, the fuel injection control module 60 initiates a dual fuel injection to lean out the air/fuel mixture and gradually shifts the fuel injection to a late injection. Concurrently, the spark timing in advanced to gradually increase the AFR. When the AFR reaches the desired AFR, the fuel injection control module 60 switches the fuel injection to a single late injection according to the injection timing of the stratified mode.

The throttle control module 66 moves the throttle plate 30 to the desired throttle position in the later stage of the transition after the air/fuel mixture attains the desired AFR and the spark timing has been shifted to the original position. Generally, when the engine 12 is operated under normal settings (i.e., the intake cam phaser is not retarded or advanced), the throttle plate 30 allows the desired air mass to flow through the throttle body 28 at the desired throttle position.

In the early stage of engine transition, however, the throttle position remains the same and the throttle area remains unchanged. The actual air mass is regulated by adjusting the intake cam phaser position. The intake cam phaser can more quickly regulate the air flow than the throttle plate 30, thereby allowing for a more quick response to the requested engine torque. In the later stage of the transition when the air/fuel mixture attains the desired AFR and the spark timing has been shifted to the original normal setting, the intake cam phaser 42 may return to the original position according to the normal setting. In this situation, the throttle control module 66 moves the throttle plate 30 to the desired throttle position to produce the desired air mass while allowing the intake cam phaser 42 to return to the original position according to the original settings. After the throttle plate 30 is moved to the desired throttle position and the intake cam phaser 42 is returned to the original settings, the transition is completed.

Figure 3A:
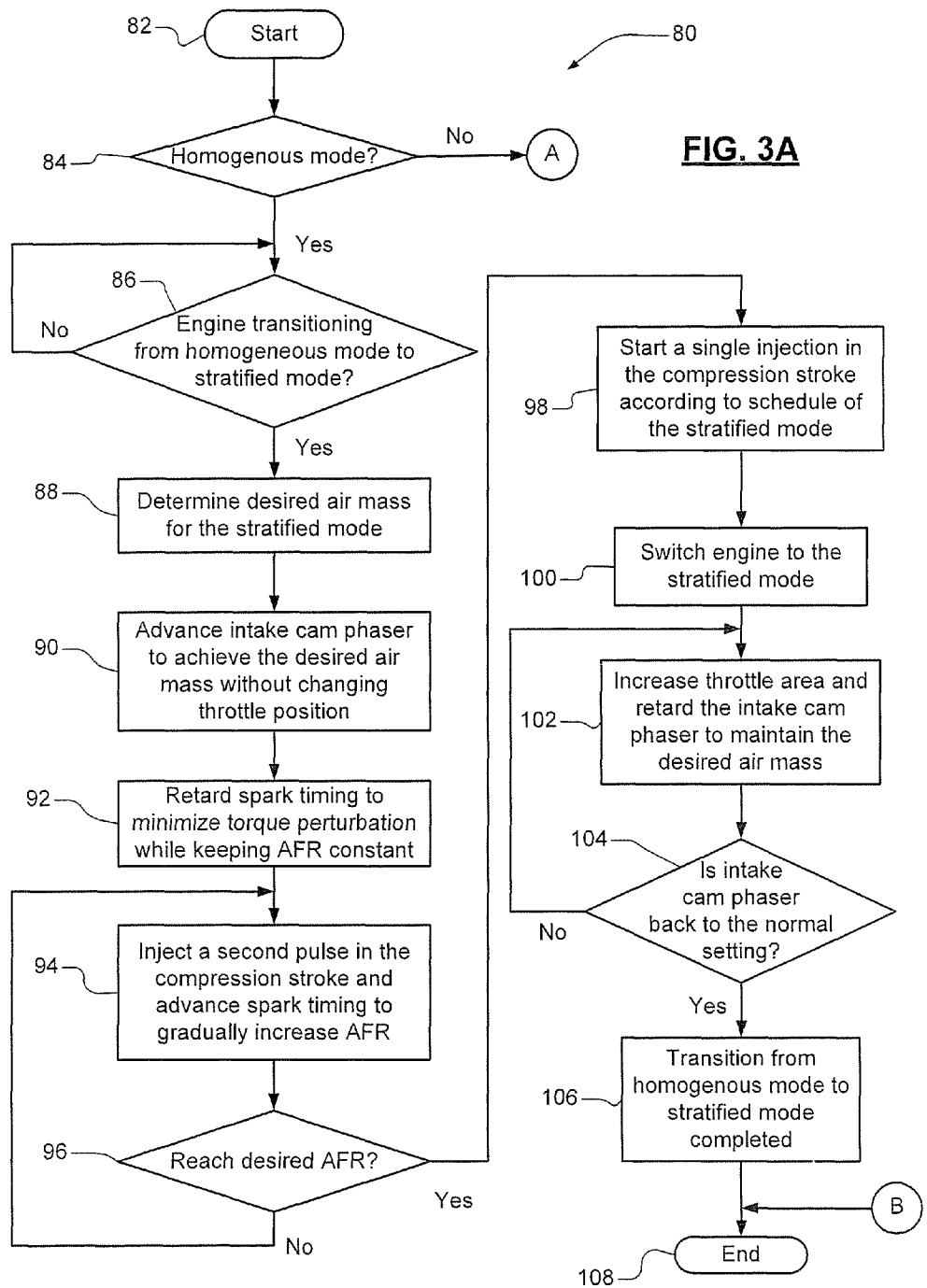
FIGS. 3A and 3B are a flow diagram of a method for transitioning an engine between a homogenous mode and a stratified mode in accordance with the teachings of the present disclosure.
Figure 3B:
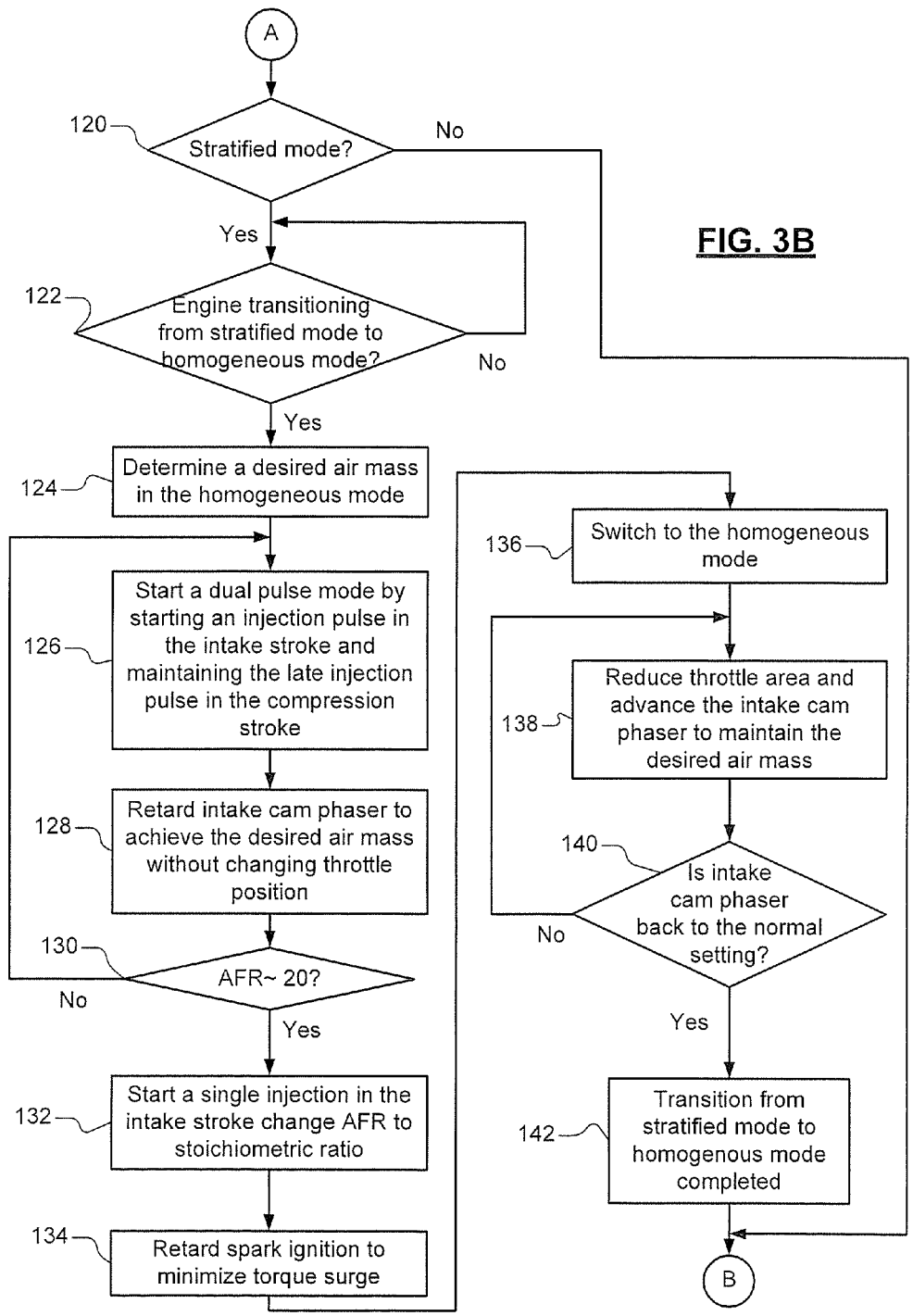

Referring to FIGS. 3A and 3B, a method of transitioning an engine between different engine modes starts in step 82. The transition control module 58 determines whether the engine 12 is currently in the homogenous mode in step 84. When the engine 12 is currently in the homogenous mode, the transition control module 58 determines whether the engine 12 should be transitioned from the homogenous mode to the stratified mode in step 86. If transition from the homogenous mode to the stratified mode is desired in step 86, the transition control module 58 determines the desired air mass for the stratified mode in step 88. The transition control module 58 selects a transition schedule. The intake cam phaser control module 64 advances the intake cam phaser to achieve the desired air mass in step 90.

The spark control module 62 retards spark timing to minimize torque perturbation while keeping AFR constant (i.e., approximately at the stoichiometric ratio) in step 92. Spark may be further retarded if additional torque reduction is needed. The fuel injection control module 60 starts a dual injection mode and the spark control module 62 starts to advance spark timing to gradually increase the AFR in step 94. The spark timing is advanced to lean out the air/fuel mixture despite the dual fuel injection.

The transition control module 58 monitors the AFR by receiving signals from the wide range oxygen sensor 52. When the AFR reaches the desired AFR (for example in the range of 25-30) in step 96, the method 80 proceeds to step 98. Otherwise, the method 80 returns to step 94 to continue the dual fuel injection and spark timing advance to increase the AFR. When the AFR reaches the desired AFR in step 96, the fuel injection control module 60 shifts the fuel injection from the dual injection to a single injection in step 98. The engine 12 starts to be operated in a stratified mode and the air/fuel mixture has the desired AFR in step 100.

Thereafter, the throttle plate is moved to increase the throttle area and the intake cam phaser is retarded to maintain the desired air mass in step 102. The intake cam phaser 42 is retarded according to a phaser offset table based on a current throttle position and the desired air mass. Concurrently, the throttle control module 66 moves the throttle plate 30 to a desired throttle position.

The transition control module 58 monitors intake cam phaser position by signals from the intake cam phaser position sensor 53. When the cam phaser position is moved to the original position according to the original normal settings in step 104, the transition is completed in step 106. Otherwise, the throttle plate and the intake cam phaser continue to be adjusted until the intake cam phaser is back to the original position based on the normal setting. The method 80 ends in step 108.

Returning to step 84, when the transition control module 58 determines that the engine 12 is not in the homogenous mode in step 84, the transition control module 58 determines whether the engine 12 is in the stratified mode in step 120. If the engine 12 is not in the stratified mode, the method 80 ends in step 108. When the engine 12 is in the stratified mode in step 120, the transition control module 58 determines whether the engine 12 should be transitioned from the stratified mode to the homogenous mode in step 122. When a transition is desired, the transition control module 58 determines a desired AFR, a desired air mass, and a desired throttle position in step 124.

The transition control module 58 selects a transition schedule to start the transition. The fuel injection control module 60 initiates a dual injection event according to the transition schedule in step 126. The first pulse is generated in the intake stroke, similar to that in the homogenous mode, and the second pulse is generated in the compression stroke similar to that in the stratified mode. After the dual injection event, the intake cam phaser 42 is retarded to achieve the desired air mass without changing the throttle position in step 128. The fuel air mixture in the combustion chamber is enriched by the dual injection mode. The enrichment is implemented through a homogeneous charge by the first pulse.

When the AFR reaches an intermediate value (for example, 20) according to the transition schedule, the fuel injection control module 60 starts a singe injection in the intake stroke according to the transition schedule in the homogenous mode in step 132. The intermediate value is between the desired AFR and a current AFR. The AFR is gradually changed to a stoichiometric ratio. In step 134, the spark ignition is retarded to minimize torque surge. When the AFR reaches the desired AFR (i.e., the stoichiometric ratio), the engine 12 starts to operate in the homogenous mode in step 136.

Thereafter, the desired air mass is maintained by adjusting the intake cam phaser position and the throttle position in step 138. The intake cam phaser 42 is advanced, while the throttle position is adjusted to reduce the throttle area. When the intake cam phaser 42 is moved back to the original position according to the normal setting in step 140, the transition from the stratified mode to the homogenous mode is completed in step 142. Otherwise, the method returns to step 138 to continue to reduce the throttle area and advance the intake cam phaser 42. The method 80 ends in step 108.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine mode control module for an internal combustion engine comprising:
    a transition control module configured to control a transition from a first engine mode to a second engine mode and that determines a desired air mass, wherein the engine is operated at a first air/fuel ratio (AFR) in the first engine mode and at a second AFR in the second engine mode and the desired air mass is based on the second AFR;
    an intake cam phaser control module configured to adjust an intake cam phaser based on the desired air mass during the transition and
    a throttle control module configured to maintain a throttle plate at a first position as the engine is transitioned from operating at the first AFR to operating at the second AFR.

2. The engine mode control module of claim 1 wherein the first position is based on the first AFR.

3. The engine mode control module of claim 2 wherein the throttle control module moves the throttle plate from the first position to a desired throttle position when the engine is operating at the second AFR, wherein the desired throttle position is based on the desired air mass.

4. The engine mode control module of claim 3 wherein an actual air mass remains constant when the throttle plate is moved from the first position to the desired throttle position.

5. The engine mode control module of claim 3 wherein the intake cam phaser control module adjusts the intake cam phaser to an original position when the throttle plate is moved from the first position to the desired throttle position.

6. The engine mode control module of claim 1 further comprising a fuel injection control module that initiates dual injections in an engine cycle during the transition.

7. The engine mode control module of claim 6 wherein the dual injections include a first injection in an intake stroke and a second injection in a compression stroke.

8. The engine mode control module of claim 1 further comprising an ignition control module that adjusts spark timing to control an actual AFR.

9. The engine mode control module of claim 1 wherein the intake cam phaser is advanced in a first stage of the transition when the engine is transitioned from a homogeneous mode to a stratified mode.

10. The engine mode control module of claim 9 further comprising a spark control module that retards a spark plug to maintain an actual AFR at a stoichiometric ratio in the first stage of the transition.

11. The engine mode control module of claim 1 wherein the intake cam phaser is retarded in a first stage of the transition when the engine is transitioned from a stratified mode to a homogenous mode.

12. The engine mode control module of claim 11 wherein spark timing is controlled to gradually increase an actual AFR.

13. A method comprising:
    controlling a transition from a first engine mode to a second engine mode, wherein an engine is operated at a first air/fuel ratio (AFR) in the first engine mode and at a second AFR in the second engine mode;
    determining a desired air mass based on the second AFR;
    adjusting an intake cam phaser based on the desired air mass; and
    maintaining a throttle plate at a first position as the engine is transitioned from operating at the first AFR to operating at the second AFR.

14. The method of claim 13 wherein the first position is based on the first AFR.

15. The method of claim 14 further comprising moving the throttle plate from the first position to a desired throttle position when the engine is operating at the second AFR, wherein the desired throttle position is based on the desired air mass.

16. The method of claim 15 wherein the throttle plate is moved to the desired throttle position after the engine is operated at the second AFR.

17. The method of claim 16 further comprising adjusting the intake cam phaser based on an actual throttle position to maintain the desired air mass.

18. The method of claim 13 further comprising initiating dual injections in an engine cycle during the transition.

19. The method of claim 13 further comprising advancing the intake cam phaser when the engine is transitioned from a homogenous mode to a stratified mode.

20. The method of claim 13 further comprising retarding spark timing during the transition.

* * * * *